Patented Nov. 24, 1942

2,302,765

UNITED STATES PATENT OFFICE 2,302,765

AMMELINE CONDENSATION PRODUCTS

John Marshall Grim, Stamford, Conn., assignor to American Cyanamid Company, New York, N. Y., a corporation of Maine No Drawing. Application September 25, 1940, Serial No. 358,301

5 Claims. (Cl. 260—72)

This invention relates to the production of ammeline-phenol-formaldehyde condensation products. In particular it relates to the production of clear acid-condensation products of ammeline with low ratios of formaldehyde suitable for the preparation of molding compositions. More particularly it relates to phenol-formaldehyde condensation products of improved light stability.

Ammeline when heated with formaldehyde in a reaction mixture which is acid due to the acid character of the ammeline condenses to a clear acid syrup when 4 or more moles of formaldehyde are combined with each mole of ammeline. With lower ratios of formaldehyde in the reaction mixture, e. g. 1 to 2 moles of formaldehyde, ammeline does not readily form clear syrups because of the relative insolubility of ammeline in aqueous formaldehyde solutions.

In the art of heat and pressure molding of thermo-setting compositions it is desirable to obtain uniform strength and appearance of the molded article and therefore a clear condensation product is usually employed for impregnating the filler. While the ammeline-formaldehyde condensation product with 4 moles of combined formaldehyde is a clear syrup, it has the disadvantage that when used as the binder in the molding composition the heat and pressure applied in the curing operation splits off formaldehyde which is loosely combined with the ammeline to such an extent that the resulting volume of gas in the mold is too large to be conveniently vented or breathed therefrom. The gas which remains trapped in the mold prevents proper curing and causes blistering of the molded article.

It is general practice to cure phenol resin molding powders in the alkaline condition, an alkaline catalyst, e. g. hexamethylene tetramine, being added to the molding powder for the purpose of hardening the resin. Also, it has been recognized that, in general, phenol condensation products tend to darken on exposure to light and that the hexamethylene tetramine imparts color to the molded article.

It is an object of the invention to provide clear acid-condensation products of ammeline and low ratios of formaldehyde suitable for the preparation of molding compositions. It is a further object to provide phenol-formaldehyde condensation products of improved light stability which may be cured on the acid side. It is an additional object to provide processes for their production. It is a still further object to provide molding compositions employing the condensation products as binders.

I have found that clear ammeline-formaldehyde condensation products which may be cured without the formation of excessive amounts of gas in the mold may be obtained by condensing a mixture containing ammeline and formaldehyde in the respective proportions of 1 mole to 1 but not substantially more than 2 moles by heating in the presence of a proportion of a phenol and, additionally, at least an equimolecular quantity of formaldehyde based on the phenol. By this same reaction there may also be obtained phenol-formaldehyde condensation products of improved light stability which may be cured on the acid side, i. e. in the acid condition.

By varying the proportions of ammeline and phenol in the reaction mixture the properties of the condensation product may be controlled. Thus by increasing the proportion of the ammeline the light resistance of the resulting condensation product will be increased, whereas with an increase in the proportion of the phenol the condensation product will have increased water and alkali resistance. A condensation product of good light stability may be obtained by the use of equal weights of ammeline and the phenol, the maximum of light resistance being obtainable at about this figure. Specifically from about 15% to about 75% ammeline and from about 85% to about 25% of the phenol based in each case upon the combined weight of these substances may be employed for the preparation of condensation products of the present invention.

The total quantity of formaldehyde in the reaction mixture should be such that, while it includes a sufficiency for condensation with the phenol, the amount available for reaction with the ammeline does not substantially exceed 2 moles per mole of ammeline employed. The customary amount of formaldehyde condensed with phenol, for example, 1¼ moles per mole of phenol, may be used in the reaction of the present invention.

I have also found that a clear syrup may be made with ammeline, a phenol having at least 2 reactive positions unoccupied, and 4 moles of formaldehyde per mole of ammeline, which may be used as a binder in molding powders without the formation of an excessive quantity of gas in the mold. This is accomplished when the amount of the ammeline employed in the reaction mixture is relatively small, for example 15%, with the phenol employed being 85%, both quantities being based on the combined weight of these substances. A 15% ammeline-85% phenol syrup, when used in a molding powder as the binder for alpha-cellulose and cured at 165° C., did not give off an excessive amount of gas in the mold. The absence of a greater quantity of gas is accounted for by the proportionate reduction in loosely combined formaldehyde carried into the mold by the smaller amount of ammeline.

The condensation products of the present invention can be obtained as clear stable syrups or as clear solids. As syrups, they will have sufficient stability to be used as such in the preparation of molding powders, or in laminating. The products may be obtained as clear brittle resins by following customary phenol resin practice which is to substantially dehydrate the clear syrup under a partial vacuum to not more than the B stage for phenol resins.

Whether the condensation syrups are stable or strongly hydrophobic will depend upon the amount of ammeline employed in their production, the syrups becoming increasingly hydrophobic and thus more unstable as the amount of ammeline is increased. If desired, all the syrups of the latter character may be reduced to clear solids by the procedure described immediately above. Clear syrups of the stable character mentioned may be obtained by employing ammeline in amounts of from about 15% up to about 50% based on the combined weight of ammeline and the phenol.

The invention is illustrated by the following specific examples to which, however, it is not intended that the invention be limited and in which parts are given by weight.

*Example 1*

A mixture containing about 25% ammeline and 75% phenol was prepared with

| | Parts |
|---|---|
| Phenol (2 moles) | 188 |
| Ammeline (0.5 mole) | 63 |
| 37% formaldehyde (3.7 moles) | 300 |

These materials were refluxed for 1.5 hours. The clear, straw-colored syrup with a pH of 5.7 was used to impregnate 160 parts of alpha-cellulose pulp. This mixture was dried at 100° C. for 1 hour, ground with 1% of zinc stearate to a powder and molded for 3 and 4 minutes respectively at 165° C. The moldings were light brown in color and had a good gloss. During 30 minutes exposure to boiling water, molded tumblers picked up 0.76% and 0.65% of water respectively.

*Example 2*

A mixture as in Example 1 was treated in accordance with customary phenolic resin procedure by being refluxed for 1 hour after which it was dehydrated by distilling off the water at 21 inches of mercury until the reaction temperature reached 110° C. On cooling the resin was brittle and had a light brown color. Part of this solid resin was placed in an open tray and heated in an oven until the most advanced B stage for phenolic resins was attained whereupon after grinding to a powder it was molded without a filler for 4 minutes at 165° C. A molded tumbler exposed to a 30 minute boil in water was very glossy and apparently unaffected by the boil; the tumbler picked up about 0.3% water.

*Example 3*

A 50% ammeline-50% phenol mixture was prepared with—

| | Parts |
|---|---|
| Ammeline (1.0 mole) | 127 |
| Phenol (1.35 moles) | 127 |
| 37% formaldehyde (3.3 moles) | 267 |

These materials were refluxed for 45 minutes. The clear, light brown syrup of pH 5.7 was then used to impregnate 150 parts of alpha-cellulose pulp. This mixture was then dried at 100° C. for 1 hour, ground with 1% of zinc stearate to a powder and the powder molded for 3 minutes at 165° C. The moldings were light brown, glossy and very hard when ejected from the mold. A molded piece exposed to a 30 minute boil in water was but slightly affected. The moldings were very light stable.

*Example 4*

A 75% ammeline, 25% phenol mixture was prepared with—

| | Parts |
|---|---|
| Ammeline (0.5 mole) | 63 |
| Phenol (.223 mole) | 21 |
| 40% formalin (1.25 moles) | 95 |

These materials were refluxed for 20 minutes and a clear, acidic, hydrophobic syrup was obtained which will precipitate on cooling. A clear solid resin may be obtained by substantially dehydrating the clear syrup by heating it under a vacuum of 21" of mercury to distill off the water, the heating being continued until the resin mass reaches a temperature of 105°–110° C. when it is poured out to cool and harden. The hard resin if not already in the final B stage for phenol resins may be ground to a powder and further heated until this stage has been reached. In this stage it is ready for the preparation of a molding powder in accordance with the customary phenol resin procedure described hereinafter.

In the practice of the process of the present invention the condensation may be brought about by heating a reaction mixture containing ammeline, aqueous formaldehyde and the phenol in the proportions above named under reflux. The reflux time may be that employed in the customary phenolic resin procedure which is about an hour or more, although in some instances it may be found that less reflux time is necessary, for example where high percentages of ammeline are employed in the reaction mixture. In any event, the reflux period may be measured by the time required to obtain a clear syrup containing the phenol resin in at least the incipient initial B stage. Reflux heating may, however, be continued until the final B stage has been attained. If the resin syrup be brought only to the initial B stage, it may, after dehydration and grinding to a powder, be brought to the final B stage by additional heat treatment.

In addition to phenol itself, the cresols, the xylenols having two reactive positions unoccupied, and the like, may be employed. The phenol employed may be replaced in part and in all proportions, or supplemented by dicyandiamide, urea or thiourea or by mixtures of these materials in the process of the present invention, additional formaldehyde being supplied to the reaction mixture in quantity sufficient to produce clear condensation products with these materials. In place of formaldehyde, the polymers thereof may be employed.

The molding compositions may be prepared from the condensation products of the present invention in the usual ways. The clear, stable syrups may be mixed with a quantity of a suitable neutral, substantially neutral, or but weakly acid filler, such as cotton floc, shredded alpha-cellulose pulp, or wood flour and the mixture dried either in an oven at about 70° C. for an hour or in the air for a longer period of time, water and unreacted formaldehyde being evaporated. Customary amounts of the filler may be employed such as 30–50% of the composition. After drying, a small amount of a mold lubricant such as zinc stearate is added and the mixture is ground to a powder in a ball mill or other suitable grinding apparatus.

Molding powders may be prepared from the solid condensation products by following customary phenol resin procedure for the preparations of molding powders. In accordance with this procedure, the solid resin is ground to a powder in a ball mill, the powder mixed with a mold lubricant and the filler on heated mixing rolls and the mix therefrom ground in a ball mill and sieved.

Molding compositions prepared in accordance with the present invention may be heat and pressure molded in the known manner at temperatures of about 150–165° C. and pressures of about 2000–3000 lb. per sq. in. The temperature and pressure will depend in each case upon the character of the binder employed, the pressure also depending somewhat on the amount and character of the filler, as will be understood by those skilled in the art.

It is desirable that the molding powder be molded under acid conditions, preferably not less acid than pH 6. Should the pH of the molding powder be higher than 6, it may be brought down by ball milling or otherwise mixing the powder with a small amount of a suitable organic acid such as phthalic acid. On the other hand, the pH of the molding powder should not be too low because of the quick setting characteristic of high acid molding compositions. This eventuality should not, in the absence of a strongly acid reacting impurity, occur with the use of the condensation syrups of the present invention since they are not strongly acidic, their acidity being due primarily to the ammeline employed in the condensation. A preferred pH for the molding composition is 5.7. Of course, latent acid catalysts may be used since these materials are substantially neutral at room temperature but become acid at the molding temperature.

It will be obvious that variations and changes in the details described above may be made without departing from the spirit and scope of the invention.

I claim:

1. A process of producing clear acid-condensation products of ammeline with low ratios of formaldehyde which comprises, heating to reaction temperature a mixture containing ammeline and formaldehyde in the respective proportion of 1 mole to at least 1 and not substantially more than 2 moles, a phenol and at least an equimolecular quantity of formaldehyde based on the phenol, the proportions of ammeline and the phenol in the mixture being from about 15 to about 75% of ammeline and from about 85 to about 25% of the phenol based on the combined weights of these substances, the total quantity of formaldehyde in the mixture being such that the above-mentioned ratio between the ammeline and the formaldehyde is not exceeded.

2. Clear acid syrups being the products of heating to condensation a mixture containing ammeline and formaldehyde in the respective proportions of 1 mole to at least 1 and not substantially more than 2 moles, a phenol and at least an equimolecular quantity of formaldehyde based on the phenol, the proportions of ammeline and the phenol in the mixture being from about 15 to about 75% of ammeline and from about 85 to about 25% of the phenol based on the combined weights of these substances, the total quantity of formaldehyde in the reaction mixture being such that the above-mentioned ratio between the ammeline and the formaldehyde is not exceeded.

2. Clear acid syrups being the products of heating to condensation a mixture containing ammeline and formaldehyde in the respective proportion of 1 mole to at least 1 and not substantially more than 2 moles, a phenol and at least an equimolecular quantity of formaldehyde based on the phenol, the proportions of ammeline and the phenol in the mixture being from about 15 to about 50% of ammeline and from about 85 to about 50% of the phenol based on the combined weights of these substances, the total quantity of formaldehyde in the reaction mixture being such that the above-mentioned ratio between the ammeline and the formaldehyde is not exceeded.

4. A thermo-setting molding composition comprising as a binder the product of heating to condensation a mixture containing ammeline and formaldehyde in the respective proportion of 1 mole to at least 1 and not substantially more than 2 moles, a phenol and at least an equimolecular quantity of formaldehyde based on the phenol, the proportions of ammeline and the phenol in the mixture being from about 15 to about 75% of ammeline and from about 85 to about 25% of the phenol based on the combined weights of these substances, where the total quantity of formaldehyde in the mixture is such that the above-mentioned ratio between the ammeline and the formaldehyde is not exceeded.

5. A thermo-setting molding composition comprising as a binder the product of heating to condensation a mixture containing ammeline and formaldehyde in the respective proportion of 1 mole to at least 1 and not substantially more than 2 moles, a phenol and at least an equimolecular quantity of formaldehyde based on the phenol, the proportions of ammeline and the phenol in the mixture being from about 15 to about 50% of ammeline and from about 85 to about 50% of the phenol based on the combined weights of these substances, where the total quantity of formaldehyde in the mixture is such that the above-mentioned ratio between the ammeline and the formaldehyde is not exceeded.

JOHN MARSHALL GRIM.